United States Patent [19]

Inoue et al.

[11] Patent Number: 5,221,784

[45] Date of Patent: Jun. 22, 1993

[54] SILICONE RUBBER COMPOSITION

[75] Inventors: Yoshio Inoue; Naoki Omura, both of Annaka, Japan

[73] Assignee: Shin Etsu Chemical Co., Ltd., Tokyo, Japan

[21] Appl. No.: 823,382

[22] Filed: Jan. 21, 1992

[30] Foreign Application Priority Data

Jan. 24, 1991 [JP] Japan .................................. 3-023944

[51] Int. Cl.$^5$ .............................................. C08K 5/16
[52] U.S. Cl. .................................... 524/714; 528/15; 528/24; 528/34; 524/188; 524/493; 524/731; 524/789; 524/847
[58] Field of Search ............................ 528/15, 24, 34; 524/188, 847, 493, 789, 731, 714

[56] References Cited

U.S. PATENT DOCUMENTS 4,417,042 11/1983 Dziark .................... 528/33

Primary Examiner—Melvyn I. Marquis
Attorney, Agent, or Firm—Nixon & Vanderhye

[57] ABSTRACT

A silicone rubber composition that will be cured using as catalyst a platinum family metal and an organic peroxide, comprising as its constituent component an organosilizane compound represented by the following general formula:

$$(R^2)_3SiNH(R^3R^4SiO)_nR^3R^4SiNHSi(R^2)_3$$

wherein $R^2$ represents a substituted or unsubstituted monovalent hydrocarbon group, $R^3$ and $R^4$, which may be the same or different, each represent a hydrogen atom or a substituted or unsubstituted monovalent hydrocarbon group, and n is an integer of 2 to 20. Even if a large amount of a silica filler is blended in this silicone rubber composition, the silicone rubber composition is excellent in that it has suitable plasticity and is low in crepe hardening and good in workability such as rollability and extrudability.

6 Claims, No Drawings

SILICONE RUBBER COMPOSITION

BACKGROUND OF THE INVENTION

1. Field of the Invention

The present invention relates to a silicone rubber composition filled highly with a silica which is excellent in plasticity and shelf stability, which is made possible by the use of a novel wetter.

2. Description of the Prior Art

It is known that when a silicone polymer is blended with a large amount of a silica filler, the resulting composition becomes excellent in physical properties such as tensile strength, tear strength, elongation, and heat resistance. To blend a large amount of a silica filler into a silicone rubber composition, a wetter also must be blended in a large amount. Conventionally, as a wetter, there is known a low-molecular weight organopolysiloxane having silanol groups at its both ends (e.g., hexamethyltrisiloxane-1,5-diol disclosed in Japanese Patent Publication (kokoku) No. 58-53021 (1983)).

However, the silicone rubber composition wherein the above wetter is used in a large amount is low in plasticity and the surface gives inevitably a tacky feeling. If the used amount is decreased to a certain extent, the crepe hardening of the obtained composition becomes high and therefore the rollability and the extrudability become poor. Further, the wetter has a drawback that the shelf stability is poor because the reactivity of the silanol group in the molecule is high.

SUMMARY OF THE INVENTION

Therefore, an object of the present invention is to provide a silicone rubber composition which, even if a large amount of a silica filler is blended therewith, exhibits a suitable plasticity and less crepe hardening and is good in workability such as rollability and extrudability.

The present invention provides a silicone rubber composition, comprising (a) an organopolysiloxane represented by the following general composition formula [I]:

$$R^1{}_aSiO_{(4-a)/2} \quad \text{[I]}$$ 

wherein $R^1$ represents a substituted or unsubstituted monovalent hydrocarbon group and a is a number of 1.95 to 2.05, alkenyl groups accounting for 0.001 to 0.5 mol % of all the $R^1$ groups and the degree of polymerization being 3,000 or over, (b) at least one organosilazane compound selected from the group consisting of compounds represented by the following general formula [II]:

$$(R^2)_3SiNH(R^3R^4SiO)_nR^3R^4SiNHSi(R^2)_3 \quad \text{[II]}$$ 

wherein $R^2$ represents a substituted or unsubstituted monovalent hydrocarbon group, $R^3$ and $R^4$, which may be the same or different, each represent a hydrogen atom or a substituted or unsubstituted monovalent hydrocarbon group, and n is an integer of 2 to 20, and compounds represented by the following general formula [III]:

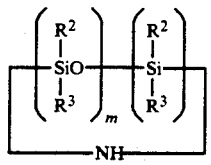

wherein $R^2$ and $R^3$ have the meanings defined above, and m is an integer of 2 to 7, and (c) a silica filler having a specific surface area of 50 $m^2/g$ or over.

The present silicone composition, even if it is blended with a large amount of a silica filler, exhibits a suitable plasticity and less crepe hardening and is good in workability such as rollability and extrudability.

DETAILED DESCRIPTION OF THE INVENTION

(a) Oraganopolysiloxanes

The organopolysiloxane which is the component (a) is a major component of the silicone rubber composition of the present invention.

In the above general composition formula [I], $R^1$ represents a substituted or unsubstituted monovalent hydrocarbon group. Further, it is required that alkenyl groups account for 0.001 to 0.5 mol %, more preferably 0.01 to 0.3 mol %, of all the $R^1$ groups. The alkenyl group includes, for example, a vinyl group, an ally group, and a butenyl group, with preference given to a vinyl group. If the ratio of the alkenyl groups is too small, the curability of the resulting composition lowers, whereas if the ratio is too large, physical properties of the resulting composition such as the tensile strength, tear strength, elongation, and heat resistance lower.

The monovalent hydrocarbon group includes, in addition to the alkenyl group, for example, a hydrocarbon group, for example, an alkyl group such as a methyl group, an ethyl group, a propyl group, a butyl group, a pentyl group, a hexyl group, an octyl group, a decyl group, and a dodecyl group, an aryl group such as a phenyl group and a tolyl group, and an aralkyl group such as a β-phenylethyl group, and a substituted hydrocarbon group formed by substituting a part or all of the hydrogen atoms of one of these hydrocarbon groups, for example, by a halogen atom(s) and/or a cyano group(s) such as a 3,3,3-trifluoropropyl group and a cyanoethyl group. Among these groups, the methyl group is generally preferable, but if it is required to impart low-temperature resistance, radiation resistance, and transparency, it is desirable that the phenyl group accounts for 2 to 20 mol % of all the $R^2$ groups. Further if it is required to impart oil resistance and gasoline resistance, it is desirable that, for example, the cyanoethyl group or 3,3,3-trifluoro group accounts for 5 to 70 mol % of all the $R^1$ groups.

It is required that a is a number in the range of 1.95 to 2.05, more preferably 1.98 to 2.02. If a is outside of the above range, it is difficult to synthesize an organopolysiloxane having a degree of polymerization of 3,000 or over.

In the organopolysiloxane (a) used in the present invention, most of the units constituting it are diorganosiloxane units, but triorganosiloxy units and $SiO_2$ units may present in an amount of about 1 mol % or less in the component (a). Further, the ends of the molecular chain may be blocked with a hydroxyl group or a triorganosiloxy group. It is required that the degree of polymerization of the organopolysiloxane, that is, the component (a) is 3,000 or over, more preferably 5,000 to 10,000, for the resulting composition to have satisfactory mechanical strength.

(b) Organosilazane compounds

The organosilazane compound that is the component (b) serves as a wetter which makes the component (c), i.e., the silica filler easily dispersed into the organopolysiloxane which is the component (a). As the organosilazane compound, linear organosilazane compounds represented by the above general formula [II] and cyclic organosilazane compounds represented by the above general formula [III] can be used, which may be used singly or in combination of two or more.

In the above general formula [III], $R^2$ is required to be a substituted or unsubstituted monovalent hydrocarbon group. The substituted or unsubstituted monovalent hydrocarbon group has preferably 1 to 10 carbon atoms and includes such a hydrocarbon group as an alkyl group, for example, a methyl group, an ethyl group, a propyl group, and a butyl group, an alkenyl group, for example, a vinyl group, an allyl group, and a butenyl group, and an aryl group, for example, a phenyl group and a tolyl group, and a substituted hydrocarbon group formed by substituting a part or all of the hydrogen atoms of one of these hydrocarbon groups, for example, by a halogen atom(s) and/or a cyano group(s) such as a trifluoropropyl group and a cyanopropyl group, with preference given particularly to a methyl group.

$R^3$ and $R^4$, which may be the same or different, each are required to be a hydrogen atom or a substituted or unsubstituted monovalent hydrocarbon group. The substituted or unsubstituted monovalent hydrocarbon group has preferably 1 to 10 carbon atoms and includes such a hydrocarbon group as an alkyl group, for example, a methyl group, an ethyl group, a propyl group, and a butyl group, an alkenyl group, for example, a vinyl group, an allyl group, and a butenyl group, and an aryl group, for example, a phenyl group and a tolyl group and a substituted hydrocarbon group formed by substituting a part or all of the hydrogen atoms of one of these hydrocarbon groups, for example, by a halogen atom(s) and/or a cyano group(s) such as a trifluoropropyl group and a cyanopropyl group. In particular, as $R^2$ and/or $R^3$, the methyl group, the vinyl group, and the phenyl group are preferable.

It is required that n is an integer of 0 to 20, preferably 2 to 3. If n is outside of the above range, it becomes difficult to synthesize the desirable linear organosilazane.

It is required that m is an integer of 1 to 6. If m is outside of this range, it becomes difficult to synthesize the desirable cyclic organosilazane.

Preferably the amount of the component (b) to be blended is 0.1 to 20 parts by weight, more preferably 1.0 to 10.0 parts by weight, per 100 parts by weight of the component (a). If the amount to be blended is too small, it becomes difficult to blend the silica filler, that is the component (c) with the component (a). On the other hand, if the amount to be blended is too large, the plasticity lowers to lower the workability extremely and physical properties of the cured product obtained by curing the composition such as the strength and tensile strength lower inevitably.

The organopolysiloxane compound (b) can be obtained by mixing an organopolysiloxane represented by the following general formula [IV]:

$$Cl(R^3R^4SiO)_nR^3R^4SiCl \qquad [IV]$$

wherein $R^3$, $R^4$ and n have the meanings defined above, and a silazane compound represented by the following general formula [V]:

$$R^2SiNHSiR^2{}_3 \qquad [V]$$

wherein $R^2$ has the meaning defined above, reacting them by blowing ammonia gas into the resulting mixed liquid at room temperature, and filtering the produced ammonium chloride, followed by stripping. The thus obtained organosilazane compound represented by the above general formula [II] includes linear organosilazane compounds, for example, represented by the following chemical formulas:

Me$_3$SiNH(Me$_2$SiO)$_3$Me$_2$SiNHSiMe$_3$,
Me$_3$SiNH(Ph$_2$SiO)(Me$_2$SiO)$_2$Me$_2$SiNHSi-Me$_3$,
Me$_3$SiNH(PhMeSiO)(Me$_2$SiO)$_2$Me$_2$SiNHSiMe$_3$,
Me$_3$SiNH(ViMeSiO)(Me$_2$SiO)$_2$Me$_2$SiNHSiMe$_3$,
Me$_3$SiNH(CF$_3$C$_2$H$_4$MeSiO)(Me$_2$SiO)$_2$Me$_2$SiNH-SiMe$_3$,
Me$_3$SiNH(HMeSiO)(Me$_2$SiO)$_2$-Me$_2$SiNHSi-Me$_3$,
Me$_3$SiNH(Me$_2$SiO)$_6$Me$_2$SiNHSiMe$_3$,
Me$_3$SiNH(Me$_2$SiO)$_9$Me$_2$SiNHSiMe$_3$,
Me$_3$SiNH(Me$_2$SiO)$_{15}$Me$_2$SiNHSiMe$_3$,
Me$_3$SiNH[(Ph$_2$SiO)(Me$_2$SiO)$_2$]$_m$Me$_2$SiNHSiMe$_3$,
Me$_3$SiNH[(ViMeSiO)(Me$_2$SiO)$_2$]$_m$Me$_2$SiNHSiMe$_3$,
and
Me$_3$SiNH[(CF$_3$C$_2$H$_4$MeSiO)(Me$_2$SiO)$_2$]$_m$Me$_2$SiNH-SiMe$_3$ wherein Me represents the methyl group, Vi represents the vinyl group, and Ph represents the phenyl group, and organosilazane compounds formed by replacing the terminal Me$_3$Si- groups of these by ViMe$_2$Si- groups. The organosilazane compound represented by the above general formula [III] includes, for example, cyclic organosilazane compounds represented by the following chemical formulas:

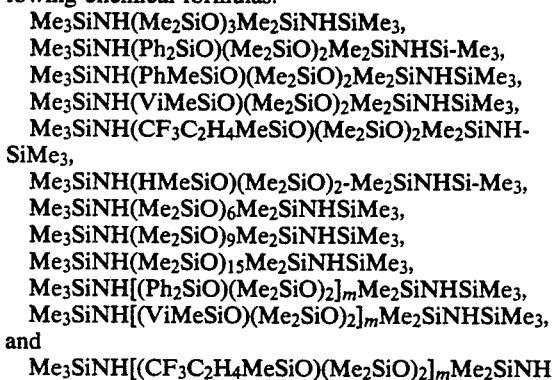

wherein Me, Vi, and Ph have the meanings defined above.

(c) Silica Fillers

The silica filler that is the component (c) is generally a silica filler preferably having a specific surface area of 50 m$^2$/g or over, more preferably 100 to 400 m$^2$/g. Such a silica filler includes, for example, fumed silica, calcined silica, and precipitated silica, which may be used singly or in combination of two or more. Further, the surface of these silica fillers may be treated, for example, with a linear organopolysiloxane, a cyclic organopolysiloxane, or hexamethyldisilazane.

The amount of the component (c) to be blended is preferably 5 to 100 parts by weight, more preferably 10 to 50 parts by weight, per 100 parts by weight of the organopolysiloxane, i.e., the component (a). If the amount is too large or too small, the workability of the resulting silicone rubber composition lowers and the cured product obtained by curing the particular silicone rubber composition will not have satisfactory mechanical strength, that is, for example, the cured product will not have satisfactory tensile strength and tearing strength.

PREPARATION OF THE SILICONE RUBBER COMPOSITION

In the present invention, the silicone rubber composition can be obtained by mixing the components (a), (b), and (c) by using a mixing machine such as a kneader followed by heat treatment. When the mixing is carried out, it is preferable to add water. The addition of water allows the organosilazane compound, i.e., the component (b) to serve as a wetter more effectively and makes it possible to obtain a silicone rubber composition better in workability. In this case, the amount of water to be used is preferably 0.01 to 10 parts by weight, more preferably 0.1 to 3 parts by weight, per 100 parts by weight of the organopolysiloxane (a).

Further, after the mixing step, heating treatment is carried out in usual manner. The conditions of the heating treatment are such that the temperature range is 100° C. to 200° C. and the heat treatment time is 1 to 5 hours, and more preferably the temperature range is 160° C. to 190° C. and the heating treatment time is 1 to 3 hours.

Additives

To the present composition, ingredients generally blended with silicone rubbers may be optionally added. For example, ground silica, diatomaceous earth, iron oxide, zinc oxide, titanium oxide, carbon black, barium oxide, magnesium oxide, cerium hydroxide, calcium carbonate, magnesium carbonate, zinc carbonate, asbestos, glass wool, finely divided mica, or fused silica powder may be added. Further, if necessary, for example, a pigment, a dye, an age resister, an antioxidant, an antistatic agent, a flame retarder (e.g., antimony oxide and chlorinated paraffin), or a thermal conductivity improver (e.g., boron nitride and aluminum oxide) may be added.

The Cured Product

In the present invention, the silicone rubber composition can be easily prepared by using a mixing machine such as two rolls, a kneader, a pressurized kneader, a Banbury mixer, and a continuous kneader. Further when the resulting silicone rubber composition is subjected to hydrosilylation or a reaction using an organic peroxide, a cured product can be obtained.

In the case of curing by hydrosilylation, as a curing agent, an organohydrogenpolysiloxane and a platinum family metal catalyst are used and the curing can be effected by heating at a temperature of 60° C. to 200° C. for 0.5 to 5 hours. The organohydrogenpolysiloxane to be used includes, for example, an organohydrogenpolysiloxane represented by the following average composition formula [VI]:

wherein $R^5$ represents a substituted or unsubstituted hydrocarbon group having 1 to 10 carbon atoms and b and c are such numbers that $0<b<3$, $0<c<3$, and $b+c$ is 1.0 to 3.0,
and having two or more —SiH groups in the molecular chain. The —SiH groups may be at the ends of the molecular chain or in the course of the molecular chain. In the above average composition formula [VI], as $R^5$, for example, an alkyl group such as a methyl group, an ethyl group, a propyl group, and a butyl group, an aryl group such as a phenyl group and a tolyl group, and a hydrocarbon group whose hydrogen atoms are replaced such as a 3,3,3-trifluoropropyl group can be mentioned.

The organohydrogenpolysiloxane used as a curing agent has preferably a degree of polymerization of 200 or below and may be linear, cyclic, or branched. The amount thereof to be used is such that the —SiH groups in the organohydrogenpolysiloxane are present preferably in an amount of 0.5 to 3.0 mol, more preferably 1.0 to 2.0 mol, per mol of the alkenyl group in the organopolysiloxane, that is, the component (a). The examples of such an organohydrogenpolysiloxane includes organohydrogenpolysiloxanes represented by the chemical formulas:

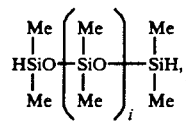

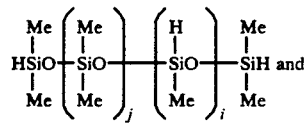

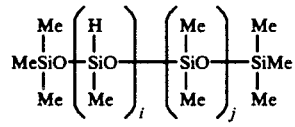

wherein i and j each are an integer of 0 or over.

Further, the platinum family metal catalyst includes a platinum catalyst, a palladium catalyst, and a rhodium catalyst, with particular preference given to a platinum catalyst. Examples of such a platinum catalyst includes a finely divided metal platinum catalyst (described, for example, in U.S. Pat. No. 2,970,150), a chloroplatinic acid catalyst (described, for example, in U.S. Pat. No. 2,823,218), a platinum/hydrocarbon complex compound (described, for example, in U.S. Pat. No. 3,159,601 or U.S. Pat. No. 3,159,662), a chloroplatinic acid/olefin complex compound (described, for example, in U.S. Pat. No. 3,516,946), and a platinum/vinylsiloxane complex (described, for example, in U.S. Pat. No. 3,775,452 or U.S. Pat. No. 3,814,780). The amount thereof to be used is generally 0.1 to 1,000 ppm (in terms of platinum), more preferably 1 to 100 ppm (in terms of platinum), based on the total amount of the organopolysiloxane, i.e., the component (a) and the above-mentioned organohydrogenpolysiloxane.

In the case of such hydrosilylation, for example, a retarding agent such as methylvinylcyclotetrasiloxane and acetylene alcohol may be added in order to retain the shelf. stability of the resulting curable composition at room temperature and suitable pot life thereof.

On the other hand, in the case of curing by using an organic peroxide, the organic peroxide is added generally in an amount of 0.1 to 3 parts by weight, more preferably 0.05 to 1 part by weight, per 100 parts by weight of the organopolysiloxane. The resulting curable composition can be cured by heating generally at 100° C. to 250° C. for 5 min to 5 hours. The organic peroxide that serves as a curing agent may be any one of those conventionally used in peroxide curing type silicone rubbers and examples include benzoyl peroxide, monochlorobenzoyl peroxide, ditertiary-butyl peroxide, 2,5-dimethyl-ditertiary-butyl peroxide, p-methylbenzoyl peroxide, 2,4-dichlorobenzoyl peroxide, dicumyl peroxide, tertiary-butyl benzoate, tertiary-butyl peroxyisopropyl carbonate, dimyristyl peroxy carbonate, dicyclododecyl peroxy dicarbonate, 2,5-bis-(tertiary-butyl peroxy)-2,5-dimethylhexane, and 2,5-bis-(tertiary-butyl peroxy)-2,5-dimethylhexyne, which may be used singly or in combination of two or more.

Uses

The present silicone rubber composition is high in plasticity and is suitable as an extrusion material, for example, for building gaskets and medical tubing and also suitable as a material, for example, for rubber contacts, dummies for babies, joint boots, plug boots, anode caps, and electric wires.

EXAMPLES

Synthesis Example 1

The following synthesis was carried out to obtain an organosilazane compound, that is, a compound (b).

First, 175.8 g (0.50 mol) of 1,7-dichloro-1,1,3,3,5,5,7,7-octamethyltetrasiloxane, 217.3 g (2.0 mol) of chlorotrimethylsilane, and 246.6 g (1.5 mol) of hexamethyldisilazane were charged into a 2-liter separable flask having a cock and equipped with a cooling tube, a thermometer, stirring blades, and a bubbler and were stirred well. Then, 34.0 g (2.0 mol) of ammonia was introduced through the bubbler into the flask and the reaction was carried out with the temperature being kept at or below 60° C. After the completion of the reaction the pH in the system was confirmed to be alkaline, and washing was carried out with 300 ml of a 25% aqueous sodium hydroxide solution once and then with 300 ml of a 15% aqueous sodium hydroxide solution twice.

Thereafter, 20 g of sodium sulfate was added to effect drying. After the drying, filtration was carried out and then distillation was carried out to obtain 23.5 g of a colorless transparent liquid having a boiling point of 57° C. (2.5 mmHg). It was identified by IR and NMR as octamethyltetrasiloxycyclosilazane represented by the following formula:

After the distillation, 123.6 g of a colorless transparent liquid was obtained as still residue. This liquid contained 1,7-bis(trimethylsilazal)-1,1,3,3,5,5,7,7-octamethyltetrasiloxane with a purity of 80% and contained by-products to some extent. The structure was identified by IR and NMR.

Synthesis Example 2

Synthesis Example 1 was repeated, except that, in place of the 1,7-dichloro-1,1,3,3,5,5,7,7-octamethyltetrasiloxane, 1,7-dichloro-vinyl-1,3,3,5,5,7,7-heptamethyltetrasiloxane was used, thereby obtaining 137.6 g of the intended 1,7-bis(N-trimethylsilylamino)-1-vinyl-1,3,3,5,5,7,7 -heptamethyltetrasiloxane. The structure was identified by NMR and IR.

Synthesis Example 3

Synthesis Example 1 was repeated, except that, in place of the 1,7-dichloro-1,1,3,3,5,5,7,7-octamethyltetrasiloxane, 1,7-dichloro-1,1,-diphenyl-3,3,5,5,7,7-hexamethyltetrasiloxane was used, thereby preparing 93.4 g of the intended 1,7-bis(N-trimethylsilylamino)1,1-diphenyl 3,3,5,5,7,7-hexamethyltetrasiloxane. The structure was identified by NMR and IR.

Using the compounds synthesized in Synthesis Examples 1 to 3, blending was effected in Examples 1 and 2.

Example 1

50 parts by weight of a methylpolysiloxane [$(CH_3)_2SiO$ unit: 99.85 mol %; $(CH_3)(CH_2=CH)SiO$ unit: 0.15 mol %; the molecular chain ends being blocked with $(CH_2=CH)(CH_3)_2SiO$ units; and viscosity: 10,000,000 cSt (25° C.)] and 50 parts by weight of a methylvinylpolysiloxane [$(CH_3)_2SiO$ unit: 99.50 mol %; $(CH_3)(CH_2=CH)SiO$ unit: 0.50 mol %; the molecular chain ends being blocked with $(CH_2=CH)(CH_3)_2SiO$ units; and viscosity: 10,000,000 cSt (25° C.)] as component (a), 8.2 parts by weight of 1,7-bis(N-trimethylsilylamino)-1,1,3,3,5,5,7,7-octamethyltetrasiloxane synthesized in Synthesis Example 1 as component (b), 50 parts by weight of fumed silica having a specific surface area of 200 m$^2$/g (Tradename: Aerozil 200, produced by Nippon Aerozil) as component (c), and 0.5 part by weight of water were charged into a kneader mixer and after they were kneaded until the mixture became uniform, the mixture was treated by heating at 170° C. for 2 hours to obtain a silicone composition.

After 1.5 parts by weight of 2,4-dichlorobenzoyl peroxide as a curing agent was added to 100 parts by weight of the obtained silicone composition, they were kneaded by two rolls until the mixture became uniform thereby obtaining a curable composition. This curable composition was cured by press curing to produce a 150 mm×200 mm sheet having a thickness of 2 mm (curing conditions: 120° C./10 min in the primary curing and 200° C./4 hours in the secondary curing). Curing was effected under the same conditions to prepare test specimens in accordance with JIS K-6301 and mechanical properties thereof under normal conditions shown in Table 1 were measured. The transparency of the cured product was evaluated by observing the above cured sheet by the naked eye. Further the Williams plasticity was measured in accordance with JIS K-6300. The obtained results are shown in Table 1.

Comparative Example 1

Example 1 was repeated, except that 12 parts by weight of hexamethyldisilazane as component (b) was used, thereby preparing a silicone rubber composition. Then, in the same way as in Example 1, a curable silicone rubber composition was obtained. This curing silicone rubber composition was cured in the same way as in Example 1 to prepare a sheet and test specimens, which were tested in the same way as in Example 1. The results are shown in Table 1.

TABLE 1

|  | Example 1 | Comparative Example 1 |
|---|---|---|
| Workability of the composition | Good | Moderate |
| Press cured at 120° C. for 10 min |  |  |
| Hardness* | 61 | 63 |
| Tensile strength (kg/cm$^2$) | 104 | 113 |
| Elongation (%) | 390 | 320 |
| Tear strength A (kg/cm) | 17 | 17 |
| Post cured at 200° C. for 4 hours |  |  |
| Hardness* | 64 | 70 |
| Tensileg strength (kg/cm$^2$) | 106 | 123 |
| Elongation (%) | 310 | 250 |
| Tear strength A (kg/cm) | 14 | 14 |
| Impact resilience (%) | 49 | 49 |
| Compression set (%) at 180° C. for 22 hours | 42 | 51 |
| Transparency | Good | Good |
| Williams plasticity at 25° C. |  |  |
| In the initial stage | 310 | 360 |
| After 20 hours | 390 | 540 |

*Remarks: Hardness was measured using a A-type Spring hardness tester provided in JIS K 6301.

EXAMPLE 2

Example 1 was repeated, except that 50 parts by weight of each of the methylvinylpolysiloxanes as component (a) which were the same as those used in Example 1 and 8.2 parts by weight of 1,7-bis(trimethylsilazal)-1,1,3,3,5,5,7,7-octamethyltetrasiloxane as component (b) were used and 0.05 part by weight of zinc stearate (releasing agent) was added, thereby preparing a silicone composition. From this silicone rubber composition, a curable silicone rubber composition was then obtained in the same way as in Example 1. Further, in the same way as in Example 1, the thus obtained curable silicone rubber composition was cured to prepared a sheet and test specimens and they were tested.

Example 3

Example 2 was repeated, except that 8.4 parts by weight of the 1,7.bis(N-trimethylsilylamino)-1-vinyl-1,3,3,5,5,7,7-heptamethyltetrasiloxane synthesized in Synthesis Example 2 was used, thereby preparing a silicone rubber composition. From this silicone rubber composition, a curable silicone rubber composition was then obtained. Further, in the same way as in Example 1, the thus obtained curable silicone rubber composition was cured to prepared a sheet and test specimens and they were tested.

Example 4

Example 2 was repeated, except that 10.4 parts by weight of the 1,7-bis(N-trimethylsilylamino)-1,1-diphenyl-3,3,5,5,7,7-hexamethyltetrasiloxane synthesized in Synthesis Example 3 was used as component (b), thereby preparing a silicone rubber composition. From this silicone rubber composition, a curable silicone rubber composition was then obtained. Further, in the same way as in Example 1, the thus obtained curable silicone rubber composition was cured to prepared a sheet and test specimens and they were tested.

Example 5

Example 2 was repeated, except that 8.0 parts by weight of the octamethyltetrasiloxycyclosilazane synthesized in Synthesis Example 1 was used as component (b), thereby preparing a silicone rubber composition. From this silicone rubber composition, a curable silicone rubber composition was then obtained. Further, in the same way as in Example 1, the thus obtained curable silicone rubber composition was cured to prepared a sheet and test specimens and they were tested.

Comparative Example 2

Example 2 was repeated, except that 12 parts by weight of hexamethylsilazane was used as component (b), thereby preparing a silicone rubber composition. From this silicone rubber composition, a curable silicone rubber composition was then obtained. Further, in the same way as in Example 1, the thus obtained curable silicone rubber composition was cured to prepared a sheet and test specimens and they were tested. The results of the measurement in Examples 2 to 5 and Comparative Example 2 are shown in Table 2.

TABLE 2

|  | Example 2 | Example 3 | Example 4 | Example 5 | Comparative Example 2 |
|---|---|---|---|---|---|
| Workability of the composition | Good | Good | Good | Good | Poor |
| Primarily cured at 120° C. for 10 min |  |  |  |  |  |
| Hardness* | 64 | 62 | 73 | 65 | 62 |
| Tensile strength (kg/cm$^2$) | 107 | 104 | 109 | 108 | 95 |
| Elongation (%) | 270 | 380 | 250 | 280 | 410 |
| Tear strength A (kg/cm) | 16 | 18 | 14 | 17 | 19 |
| Secondarily cured at 200° C. for 4 hours |  |  |  |  |  |
| Hardness* | 69 | 64 | 74 | 70 | 65 |
| Tensile strength (kg/cm$^2$) | 114 | 110 | 104 | 115 | 98 |
| Elongation (%) | 220 | 350 | 240 | 250 | 390 |
| Tear strength A (kg/cm) | 14 | 16 | 13 | 15 | 18 |
| Impact resilience (%) | 49 | 46 | 46 | 48 | 35 |
| Compression set (%) at 180° C. for 22 hours | 65 | 43 | 44 | 63 | 73 |
| Williams plasticity at 25° C. |  |  |  |  |  |
| In the initial stage | 300 | 310 | 350 | 310 | 365 |
| After 12 hours | 360 | 380 | 360 | 340 | 540 |

*Remarks: Hardness was measured using a A-type Spring hardness tester provided in JIS K 6301.

From Tables 1 and 2, it can be understood that the present silicone rubber composition is low in crepe hardening and excellent in workability.

We claim:

1. A curable silicone rubber composition, comprising
(a) an organopolysiloxane represented by the formula [I]:

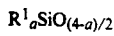 [I]

wherein $R^1$ represents a substituted or unsubstituted monovalent hydrocarbon group and a is a number of 1.95 to 2.05, alkenyl groups accounting for 0.001 to 0.5 mol % of all the $R^2$ groups and the degree of polymerization being 3,000 or over,
(b) at least one organosilazane compound selected from the group consisting of compounds represented by the formula [II]:

 [II]

wherein $R^2$ represents a substituted or unsubstituted monovalent hydrocarbon group, $R^3$ and $R^4$, which may be the same or different, each represent a hydrogen atom or a substituted or unsubstituted monovalent hydrocarbon group, and n is an integer of 2 to 20, and compounds represented by the formula [III]:

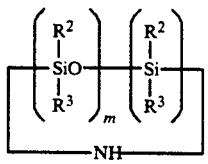 [III]

wherein $R^2$ and $R^3$ have the meanings defined above, and m is an integer of 2 to 7,
(c) a silica filler having a specific surface area of 50 m²/g or over, and
(d) as a curing agent, in combination, an organo hydrogenpolysiloxane and a platinum family metal catalyst.

2. A curable silicone rubber composition, comprising
(a) an organopolysiloxane represented by the formula [I]:

 [I]

wherein $R^1$ represents a substituted or unsubstituted monovalent hydrocarbon group and a is a number of 1.95 to 2.05, alkenyl groups accounting for 0.001 to 0.5 mol % of all the $R^1$ groups and the degree of polymerization being 3,000 or over,
(b) at least one organosilazane compound selected from the group consisting of compounds represented by the formula [II]:

 [II]

wherein $R^2$ represents a substituted or unsubstituted monovalent hydrocarbon group, $R^3$ and $R^4$, which may be the same or different, each represent a hydrogen atom or a substituted or unsubstituted monovalent hydrocarbon group, and n is an integer of 2 to 20, and compounds represented by the formula [III]:

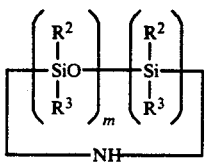 [III]

wherein $R^2$ and $R^3$ have the meanings defined above, and m is an integer of 2 to 7,
(c) a silica filler having a specific surface area of 50 m²/g or over, and
(d) an organic peroxide curing agent.

3. The curable rubber composition of claim 1 containing 0.1–20 parts by weight of the organosilazane compound of component (b) and 5–100 parts by weight of the silica filter of component (c) per 100 parts by weight of the organopolysiloxane of component (a).

4. The curable rubber composition of claim 2 containing 0.1–20 parts by weight of the organosilazane compound of component (b) and 5–100 parts by weight of the silica filter of component (c) per 100 parts by weight of the organopolysiloxane of component (a).

5. A cured product obtained by curing a curable silicone rubber composition as claimed in claim 1.

6. A cured product obtained by curing a curable silicone rubber composition as claimed in claim 2.